UNITED STATES PATENT OFFICE.

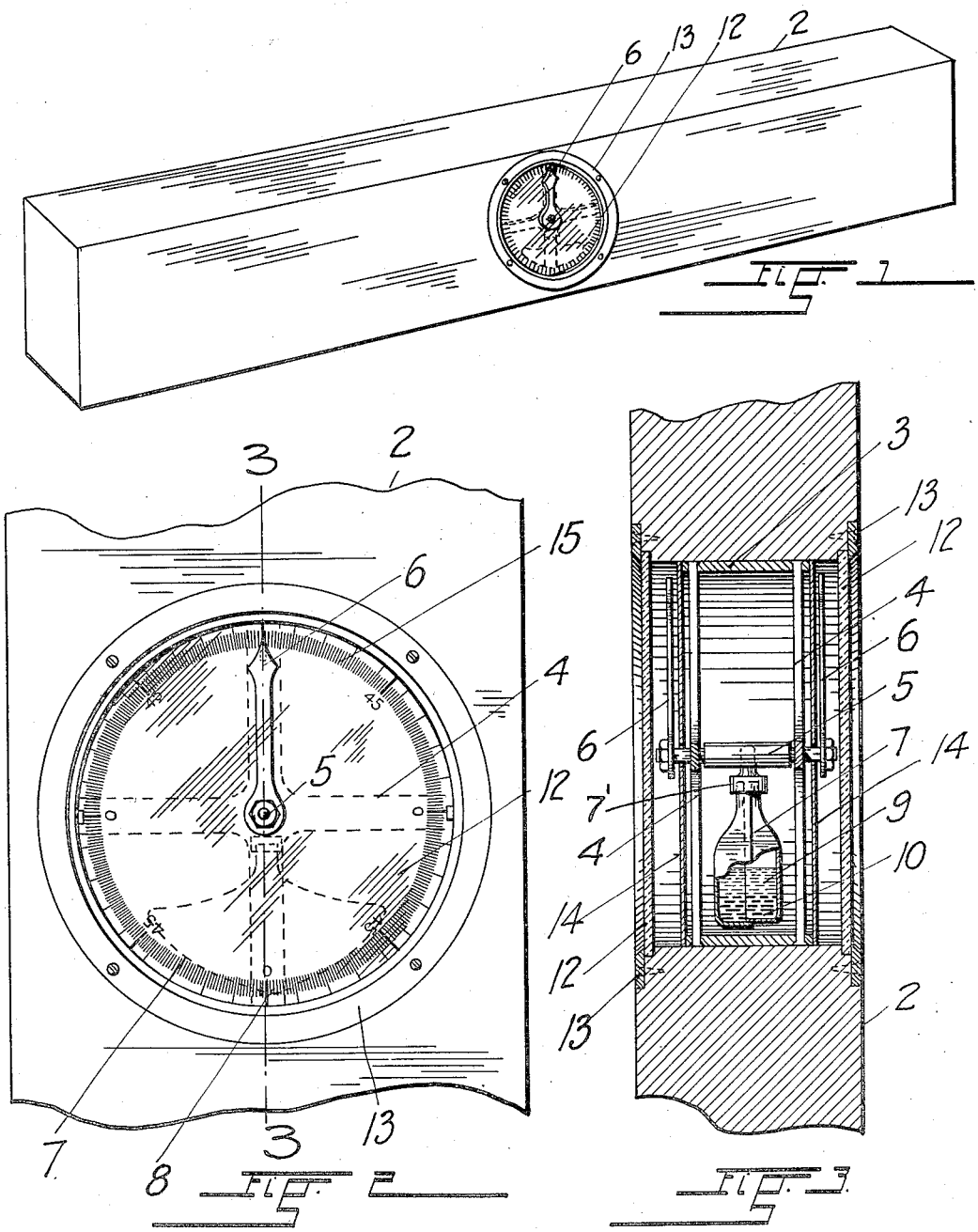

ARNOLD J. MOONEN, OF DENVER, COLORADO, ASSIGNOR, BY DIRECT AND MESNE ASSIGNMENTS, TO THE NATIONAL AUTOMATIC LEVEL AND INSTRUMENT COMPANY, A CORPORATION OF COLORADO.

APPLIANCE FOR LEVELING INSTRUMENTS.

1,094,583. Specification of Letters Patent. Patented Apr. 28, 1914.

Application filed January 24, 1912. Serial No. 673,247.

*To all whom it may concern:*

Be it known that I, ARNOLD J. MOONEN, a citizen of the United States, residing at Denver, in the county of Denver and State of Colorado, have invented certain new and useful Improvements in Appliances for Leveling Instruments, of which the following is a specification.

My invention relates to leveling instruments and its object is to provide in connection with any instrument of this class, an appliance of simple construction which will speedily and accurately indicate the angular position of the instrument to which it is applied with reference to either a horizontal or vertical line or plane.

The appliance consists to this end of a fixed circular scale, and a pointer which being pivoted in central relation to said scale, is counterbalanced so as to extend at all times in a vertical position and thus indicate on the scale the angle to which the instrument has been adjusted with reference to either the horizontal or the perpendicular.

The counterbalance consists of a vessel whose interior bottom-surface curves in arcs which intersect in a point in the vertical plane passing through the pivotal axis of the pointer so that a body of liquid contained in said vessel will speedily come to rest at the said point when by adjustment of the instrument to which the appliance is attached, the equilibrium of the pointer is disturbed. This body of liquid consists of a quantity of mercury to which has been added a proportionately small quantity of oil which not only facilitates the movement of the mercury by lessening the friction between its surface and that of the vessel, but which, furthermore, will counteract any corrosive or other detrimental influence the mercury may have on the metal of which the vessel is composed.

When the instrument to which my invention is applied, is adjusted to a selected position, the liquid contained in the vessel will by its tendency to remain at rest at a point in the perpendicular plane passing through the axis of rotation of the pointer, quickly restore the latter to its perpendicular position and effectively eliminate the vibrative movement always present in bodies counterbalanced by solid weights, after the equilibrium thereof has been disturbed. The circular scale on which the angle of the instrument is indicated by the pointer has four zero points disposed at quadrant points, the quadrant arcs between them being subdivided into ninety degrees. By thus graduating the scale the position of either side or either end of the instrument with reference to either the perpendicular or the horizontal will be accurately indicated.

While in the accompanying drawings, my invention has been illustrated as applied to an instrument commonly known as a "spirit level," I wish it understood that the same may be employed with equally beneficial results in connection with surveying instruments or in fact with all devices of which it is desired to ascertain the position with reference to a horizontal or vertical line or plane.

In the drawings in the several views of which like parts have been similarly designated by numerical reference characters, Figure 1 represents a perspective view of a level to which my invention has been applied, Fig. 2, a fragmentary elevation of the same, and Fig. 3, a section taken along the line 3—3, Fig. 2.

The leveling instrument designated by the numeral 2 has a central transverse bore for the reception of my improved appliance which is composed of a cylindrical casing 3 fitted in said bore and provided in proximity to its ends, with spiders 4 which provide bearings for an axially extending arbor 5 at whose opposite ends the pointers 6 are fixedly secured.

The casing 3 is closed at its ends by means of dial-plates 14 through which the ends of the arbor project and which upon their outer faces have the circular scales 15 hereinbefore referred to, on which the pointers which are disposed exteriorly of the closed casing, indicate the angular positions of the instrument.

The vessel 7 which forms the counterbalance for the pointers is formed in halves which are received one within the other so as to have their adjacent inner edges overlap, said overlapping edges being soldered to connect the halves. Received over the contracted portions of the halves, which contracted portions form the neck of the vessel 7, is a cap 7' which latter is connected to the arbor 5 and acts not only to support the vessel from the arbor, but also as a closure for the vessel.

The interior bottom surface of the vessel is, as mentioned hereinbefore, curved in arcs which intersect in a point in the vertical plane passing through the pivotal axis of the pointer and the body of mercury and the proportionately small quantity of oil contained in the vessel are in Fig. 3 of the drawings respectively designated by the numerals 9 and 10.

The bore of the instrument 2 is closed at its ends by glass plates 12 which are held in place by retaining rings 13.

Having thus described my invention what I claim is:

In a leveling instrument, a body having a bore, a casing in the bore, spiders in the bore at the casing ends, an arbor movably supported from said spiders, a pointer on the arbor a dial plate through which one end of the arbor passes, a pointer on said end of the arbor, and a counterbalance for the pointer consisting of a vessel having a body of liquid therein, the vessel being formed in two parts received one within the other to have their adjacent inner edges overlap, the upper portions of said vessel parts being contracted to form a neck for the vessel, and a combined closure and suspending means for the vessel consisting of a cap received over the vessel neck and connected to the arbor.

In testimony whereof I have affixed my signature in presence of two witnesses.

ARNOLD J. MOONEN.

Witnesses:
G. J. ROLLANDET,
P. RHOADES.